June 10, 1921.
B. B. WHITTAM
WINDOW GLASS FASTENER
Filed March 21, 1919     4 Sheets-Sheet 1
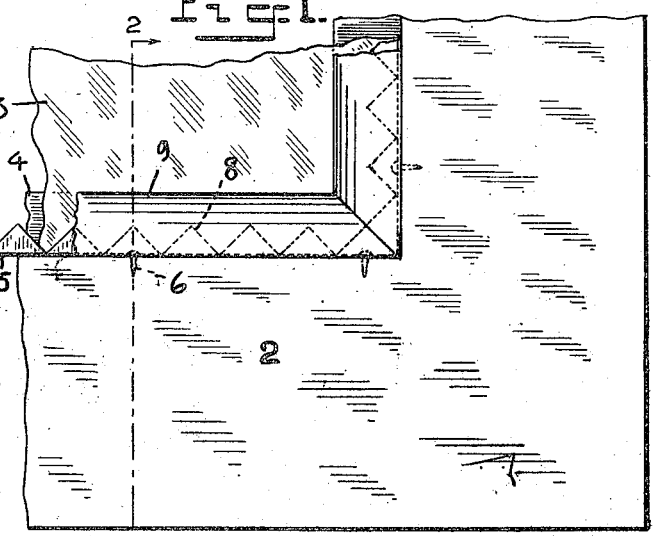
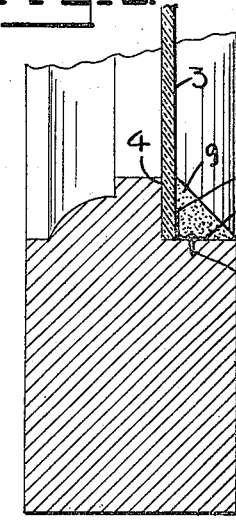
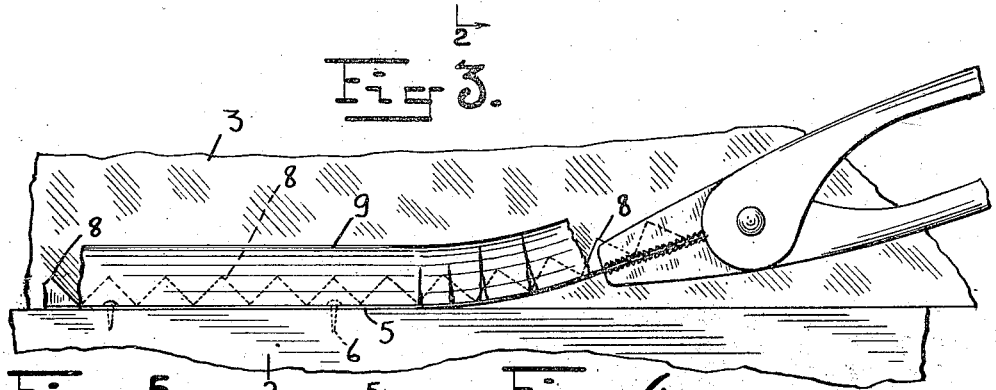
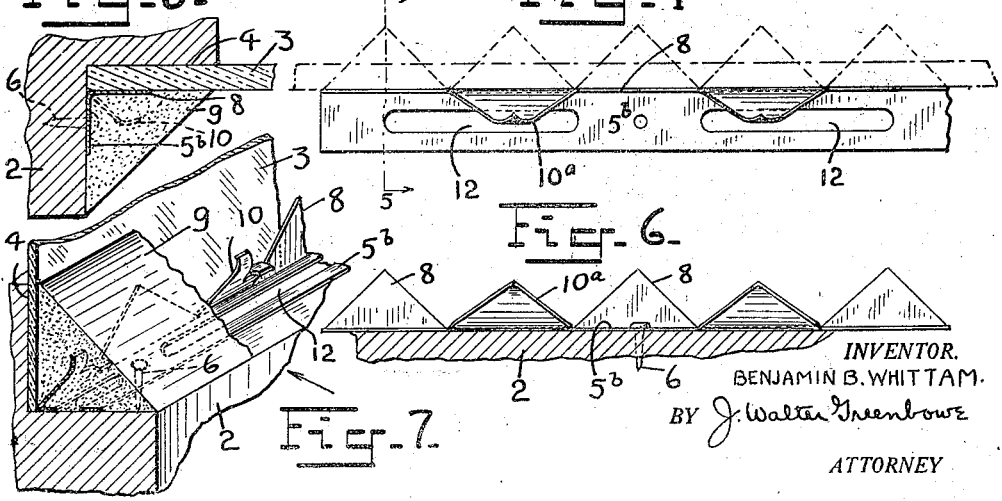
INVENTOR.
BENJAMIN B. WHITTAM.
BY J. Walter Greenbowe
ATTORNEY June 10, 1924.
B. B. WHITTAM
WINDOW GLASS FASTENER
Filed March 21, 1919
1,496,916
4 Sheets-Sheet 2
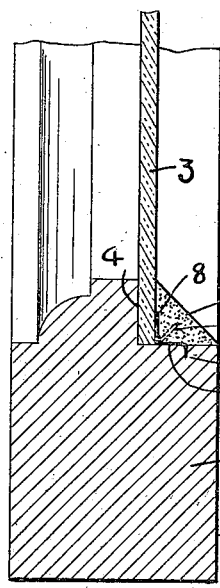
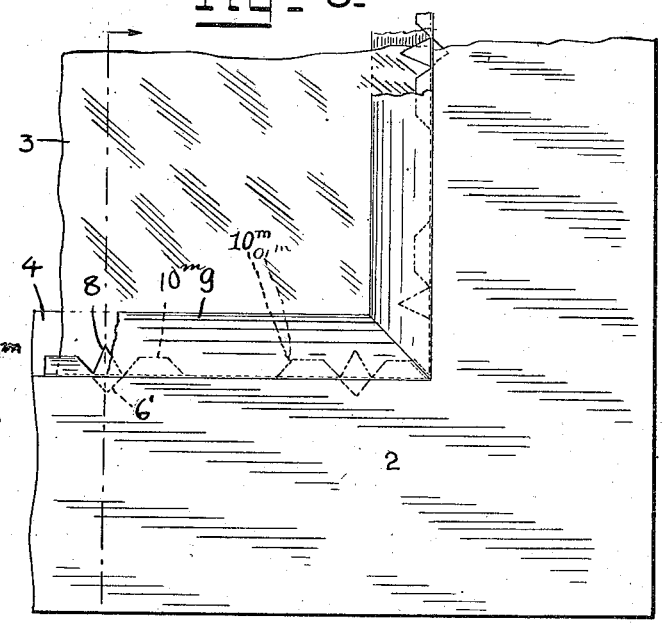
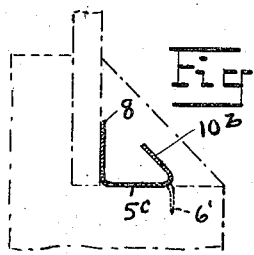
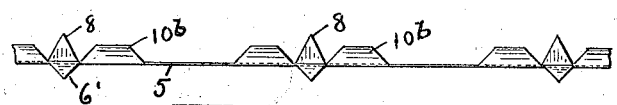
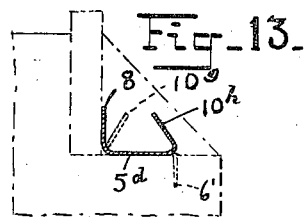
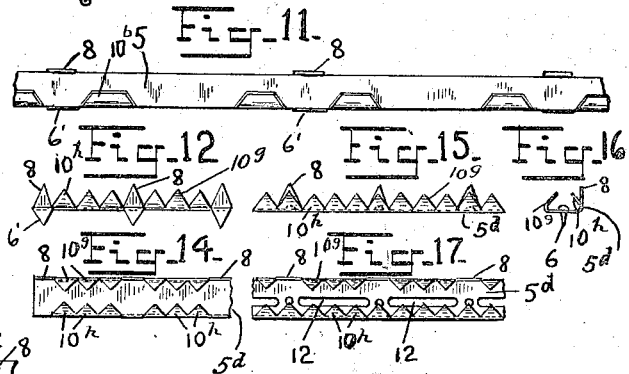
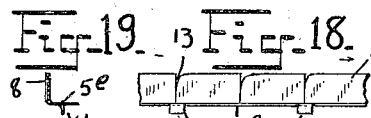
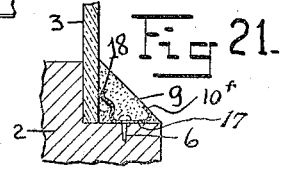
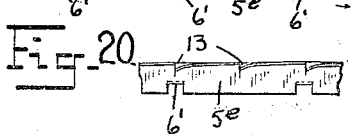
INVENTOR.
BENJAMIN B. WHITTAM
BY J. Walter Greenbowe
ATTORNEY June 10, 1924.
B. B. WHITTAM
1,496,916
WINDOW GLASS FASTENER
Filed March 21, 1919
4 Sheets-Sheet 3
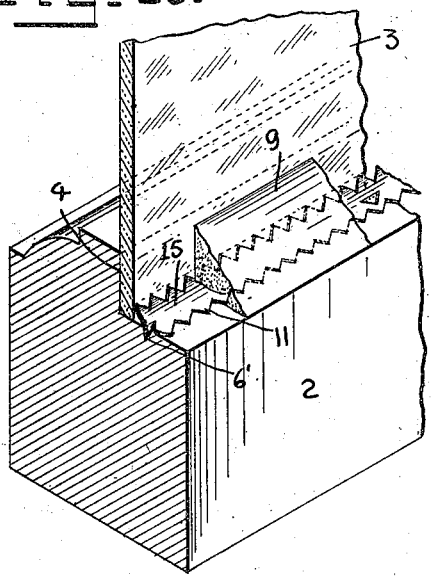
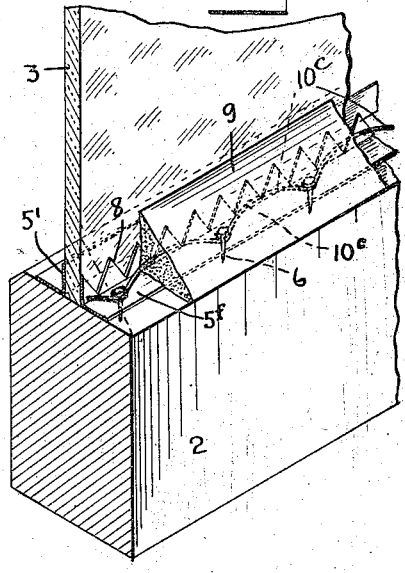
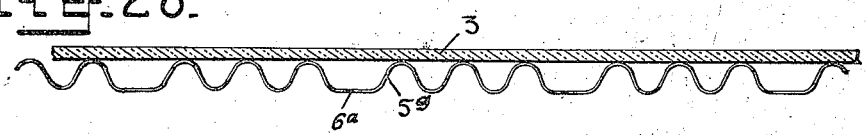
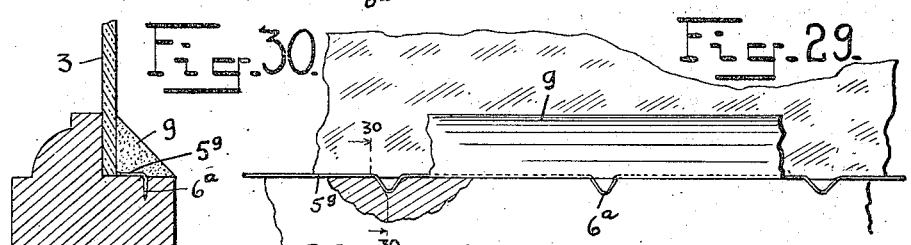
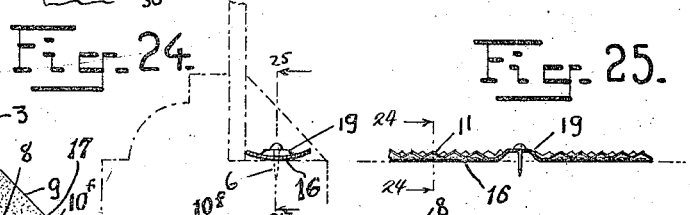
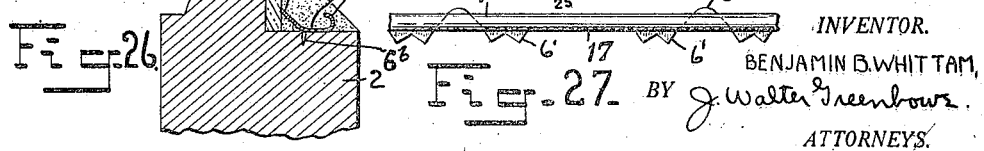
INVENTOR.
BENJAMIN B. WHITTAM,
BY J. Walter Greenbowe.
ATTORNEYS.

June 10, 1924.
B. B. WHITTAM
1,496,916
WINDOW GLASS FASTENER
Filed March 21, 1919      4 Sheets-Sheet 4
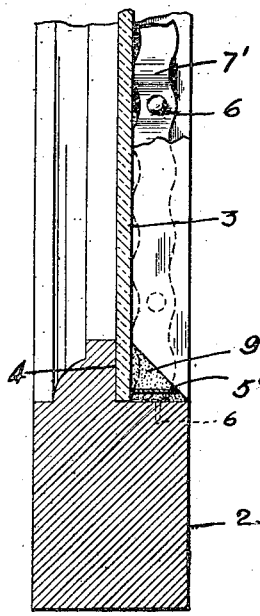
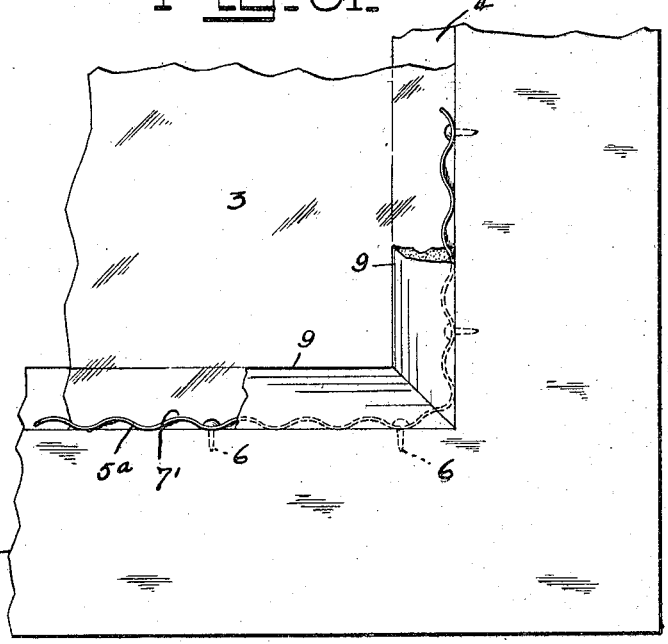
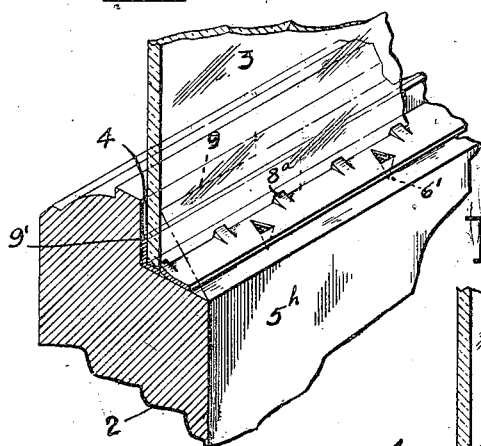
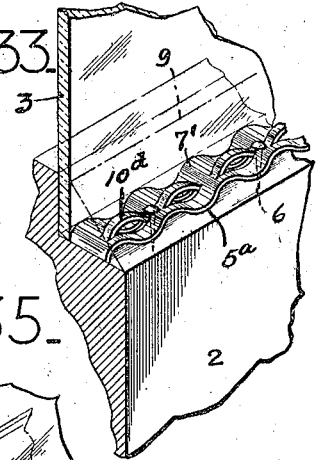
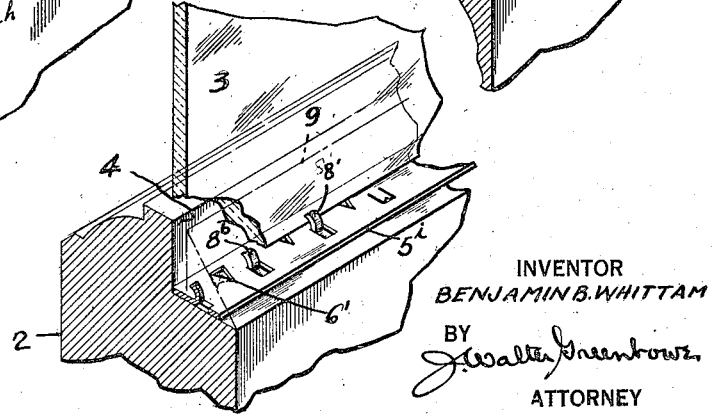
INVENTOR
BENJAMIN B. WHITTAM
BY
J. Walter Greenbowe
ATTORNEY Patented June 10, 1924.

1,496,916

UNITED STATES PATENT OFFICE.

BENJAMIN B. WHITTAM, OF ELIZABETH, NEW JERSEY.

WINDOW-GLASS FASTENER.

Application filed March 21, 1919. Serial No. 284,144.

*To all whom it may concern:*

Be it known that I, BENJAMIN B. WHITTAM, a citizen of the United States, and a resident of 348 Grier Avenue, Elizabeth city, Union County, and State of New Jersey, have invented certain new and useful Improvements in Window-Glass Fasteners, fully described and represented in the following specification and the accompanying drawings, forming a part of the same.

My invention relates generally to a device for the purpose of retaining a plate or panel in a frame and more particularly to window frames or casements where it is desirable to fasten a pane of glass in such manner that it may be expeditiously and economically removed.

In the fastenings commonly used for securing a window glass in its frame it is well known that the removal of glass, secured by such means, namely, with tacks and putty, causes great difficulty and a consequent loss of time, also resulting frequently in material damage to the frame. This is due to the fact that the hardened putty must be chiseled or gouged away and the many tacks removed separately.

The object of my invention is to eliminate the above disadvantages and I provide first: A retaining strip to be applied to a window frame and in contact with the glass to hold the same in place.

Second: A fastener so constructed as to permit the use of putty or other plastic material as a seal in the usual manner and also to provide a means for anchoring the seal against displacement.

Third: A fastening that may be stripped from the frame easily and efficiently whereby the removal of the strip effects the removal of all tacks and putty.

Fourth: To provide a fastening device that may be removed and replaced many times without having its utility destroyed, and one which is applicable to all standard window frames and may be purchased either in predetermined lengths or in a continuous piece by the roll, and cut in the field.

These and other objects of the invention will be understood by reference to the accompanying drawings in which:

Fig. 1 is an outside view of a portion of a window, showing my fastening device applied thereto;

Fig. 2 is a vertical cross section taken on line 2—2 in Fig. 1;

Fig. 3 is an illustration of the method of removing the fastener and seal in one operation;

Fig. 4 shows a plan view of a portion of the retaining strip having seal anchoring members and also shows slots in the body of the strip;

Fig. 5 is a cross section of the strip taken on line 5—5 in Fig. 4 but showing the device as applied to a window;

Fig. 6 is a front view of Fig. 4;

Fig. 7 is an isometric perspective view showing the strip applied to a window and having anchoring members with double prongs bent in opposite directions.

Fig. 8 is an outside view of a portion of a window showing another form of my fastener in which the fastening means is integral with the strip.

Fig. 9 is a vertical cross section of Fig. 8 taken through the fastening means.

Fig. 10 is an elevation of another form of the fastener having locking members arranged at intervals along the outer edge.

Fig. 10ª is a vertical section of Fig. 10 showing the fastener in position, the frame and plate being shown in dotted lines.

Fig. 11 is a plan view of Fig. 10.

Fig. 12 is an elevation of another form of my strip and shows double and inversely bent locking members.

Fig. 13 is a vertical section of Fig. 12.

Fig. 14 is a plan view of Fig. 12.

Fig. 15 is a side view of a fastener having double locking members and arranged to be fastened by tacks or nails.

Fig. 16 is a vertical section of Fig. 15.

Fig. 17 is a plan of Fig. 15 and shows slots whereby the plastic material may contact with the frame.

Fig. 18 is a side view of another form of my fastener provided with saw cuts arranged at intervals.

Fig. 19 is a vertical section of Fig. 18.

Fig. 20 is a plan view of Fig. 18.

Fig. 21 is a vertical section of another form of my strip in which the projections in contact with the plate are in the form of tension members.

Fig. 22 is a perspective view of a portion of a window frame with a strip in place and showing a locking member in the form of a looped wire.

Fig. 23 is a perspective view of a portion of a window-frame and showing a form of fastener in which the points of the projections contact with the plate.

Fig. 24 is a vertical section of a strip having a raised portion or boss through which a nail or fastening means may pass.

Fig. 25 is a side view of the strip shown in Fig. 24 and partly in section where hatched to show the raised portion or boss.

Fig. 26 is a vertical section of a strip having a curled edge to form a lock for the plastic material.

Fig. 27 is a side view of the strip as shown in Fig. 26.

Fig. 28 is a plan view of my fastener formed of a wire of sinuous shape.

Fig. 29 is a side view of the fastener shown in Fig. 28.

Fig. 30 is an end view of Fig. 29.

Fig. 31 is a front view of a frame showing my fastener formed with corrugations to form projections for contact with the plate.

Fig. 32 is a vertical section of Fig. 31.

Fig. 33 shows a strip similar to that shown in Figs. 31 and 32 but having loops to form a lock for the plastic material.

Fig. 34 is a perspective view of another form of my strip in which the raised portions which contact with the plate, are bent up from the strip base, and Fig. 35 is a perspective view of another form of my fastener with the raised portions or projections stamped from the strip.

The drawings show the invention applied to a window frame 2 having a glass pane, 3, supported therein and against the usual ledge, 4, which forms a backing and prevents the glass from moving in one direction or inwardly through the frame.

For the purpose of retaining the glass in position and against its backing or ledge 4, I provide, as a fastening device, a thin metallic strip or retaining member 5 which is secured to the frame by separate tacks 6 or I provide a strip secured by other means as the barbs or teeth 6' integral with the strip as shown. The strip is so arranged that when secured to the frame, one side or edge contacts with the glass which is thereby held firmly in place.

When desirable I provide a strip 5ª with elevated portions 7' as shown in Figs. 31, 32 and 33 or with raised portions or upwardly turned projections 8 as shown in Figs. 1, 2 (and in several of the other figures) arranged to contact with the glass. These raised portions are provided to compensate for any difference between the perimeter of the glass and the perimeter of the aperture to which the glass is applied. Thus a larger range of contacting surface of the strip with the glass is obtained.

When the strips have been applied to a frame and the glass therein is held in the required manner, a seal 9 of putty or other plastic material may be molded around the frame and over the strip to give the necessary protection from the elements. The window then has the same neat appearance as has been found desirable in building construction.

An important feature of my fastener consists in providing a means of anchoring the putty or other seal in position on the frame and for this purpose I provide a strip 5ᵇ with locking members or anchors 10 or 10ᵃ as shown in Figs. 4, 5, 6, and 7, which project into or pass through the body of the seal and anchor it against displacement. This is of great advantage since it is well known that in the course of time and after exposure putty as commonly applied tends to break loose and fall away from the frame. This provision for anchoring the putty to the frame makes it unnecessary to prime the seal contacting surface of the frame.

The said putty locking members are shown in Figs. 8 and 9 in the form of a plurality of projections 10ᵐ bent inwardly from the inner edge of the strip.

Another form of the anchor or locking member is shown in Fig. 10 which is a side view of a portion of a strip 5ᶜ. In this construction the anchor member 10ᵇ is shown on the outer edge of the strip and bent inwardly.

Double and inversely bent locking members 10ʰ and 10ᵍ are shown in Figs. 12 to 17. Fig. 17 also shows slots 12 in the strip through which the plastic material may contact with the frame to afford a more complete seal; similar slots are shown in Figs. 4 and 7.

To facilitate the bending of a strip 5ᵉ shown in Figs. 18, 19 and 20, I provide saw cuts 13 suitably spaced along one side. Thus the strip may be easily and safely bent to be adjusted to an uneven surface or to be wound on a spool for shipment. Fig. 22 shows a strip 5ᶠ having projections 8 and provided with an anchor 10ᶜ for the putty 9, the anchor is in the form of an undulated wire secured by tacks.

In Fig. 23 a strip 15 is shown of a dished form and the putty fills the crevices between the raised edge 11 of the strip and the frame and is locked in position.

In Fig. 24 a strip 16 is shown having a boss 19 raised above the concave surface of the strip at the point where the tack passes through. This permits the tack to be driven tightly into the frame without distorting the strip.

Figs. 21 and 27 show a strip 17 provided with an anchor member, for securing the putty to the strip, in the form of the curled or hooked edge 10ᶠ. Fig. 21 also shows the strip made with projections 18 arranged to give a spring contact against the glass. Figs. 28, 29 and 30 show a strip 5ᵍ in the form of a sinuous member which may be of relatively stiff wire. Loop 6ᵃ may be bent from the strip and the strip secured to a window frame by embedding the loops therein. Portions of the strip may make contact with the glass to hold it from displacement.

In Figs. 31 and 32 the fastener is shown with alternating high and low portions to form projections 7′ for contact with the glass, and Fig. 33 shows a similarly shaped strip but having putty locking members 10ᵈ of loop form made by punching a part of the body of the strip upwardly in such manner as to make a bridge or loop above each of the concave or low portions.

The advantage of this form will be readily understood since the high portions 7′ provide the desirable range of contact area between the glass and the edge of the strip and the loops afford a secure hold for the putty which is forced thereunder. It will also be seen that the plastic material which forms the seal may be pressed under the greater part of the strip. This gives a large and desirable contact area between the frame and the seal.

This form of fastener is both simple and cheap, necessitating but a minimum number of forming operations to manufacture and no loss of metal.

Fig. 34 is a perspective view of another form of my fastener applied to a window and shows a strip 5ʰ having projections 8ᵃ in the form of spring tongues. This strip is also provided with an angularly disposed wall 9′ and may be inserted in the frame and secured thereto by tacks or teeth, the said wall being located adjacent the ledge 4. The glass is then inserted in the frame and its edges snapped over the tongues which are thus bent down, to permit the glass to pass, but which again return to their original position and prevent the outward movement of the glass.

The putty seal may readily be laid over the strip.

Fig. 35 is a perspective view of my fastener in which a strip 5ⁱ is provided with a plurality of portions 8ᵇ partly cut therefrom and arranged to lie flush with the surface of the strip. After the strip is secured to the frame and the glass located in position for fastening, the said portions are bent upwardly and toward the glass and form projections 8ᵇ to contact with and hold the pane in position. Notches 8′ may be provided as a means of applying a pointed tool to lift the projections.

Referring to Figs. 34 and 35 it will readily be seen that with the form of fastener shown therein, the glass is practically locked in position and it would be exceedingly difficult for any one to remove the glass after it has been fastened in the manner shown.

If a glass breaks, however, it is simply necessary to withdraw the pieces from the frame and then strip off the fastener and putty from the frame.

The invention may be applied to many different shaped apertures in which no ledges are provided; in which case a strip 5′ as shown in Fig. 22, may be secured to the inner side of the aperture as a backing for the plate 3. It will be evident that owing to the resilient property possessed by my strip, it is readily adjustable to a surface of curved form, as in a window of oval or circular shape.

It will be seen from the foregoing that in practice my device is adapted to firmly hold a glass in its frame and is of such construction that it permits the application of the usual plastic seal, which is well known in the art as an efficient and desirable means of protection from the weather.

When it is necessary to remove my fastening device one end of the strip may be pried up and gripped with any suitable tool as a pinchers, and the strip torn from the frame, the putty and tacks being at the same time removed, leaving the frame clean, for the removal or insertion of a pane.

What I claim and desire to secure by Letters Patent of the United States is:—

1. A fastener adapted for application to a window frame, for the purpose of retaining a plate therein, comprising a strip having means connected therewith for securing the strip to the frame adjacent the said plate and a layer of plastic material arranged to substantially cover the strip, the strip being composed of a yielding material and thus adapted to be quickly stripped from the frame and simultaneously remove the seal and fastening means.

2. A fastener in the form of a strip for application to a window frame having therein a glass plate held from inward movement by a ledge, a plurality of raised portions along one edge of the strip, means whereby the said strip may be secured to the frame with the said projections contiguous to the glass to prevent the outward movement of the same and projecting claws integral with the strip to anchor a plastic seal after said seal has been applied to the strip.

3. A retaining member adapted for application to a window frame having a glass therein, means whereby the said member may be secured to the frame, projections upon the member arranged to contact with the glass and a plurality of anchor members spaced at intervals along the member for the purpose of holding a seal from displacement after the same has been applied to the strip, substantially as described.

4. A fastener of the class described comprising a metallic strip for the purpose of holding a glass in a frame, projections along one side of the strip, means whereby the said fastener may be secured to the frame and with the said projections adjacent the said glass and anchor members secured at intervals along the fastener and arranged to strengthen and anchor a seal after said seal has been applied to the frame as and for the purpose set forth.

5. A device for fastening a window glass in a frame comprising a retaining strip having a plurality of flexible projections along one side thereof, means whereby the said strip is fastened to a frame with the projections adjacent the side of the glass and anchor-members integral with the strip for the purpose of anchoring a plastic seal in position after the said seal has been applied to the strip, substantially as described.

In testimony whereof I have hereunto set my hand.

BENJAMIN B. WHITTAM.